United States Patent [19]

Hubertson

[11] 4,286,769
[45] Sep. 1, 1981

[54] VALVE SEAT

[75] Inventor: Folke H. Hubertson, Säffle, Sweden

[73] Assignee: Aktiebolaget Somas Ventiler, Säffle, Sweden

[21] Appl. No.: 87,527

[22] Filed: Oct. 23, 1979

Related U.S. Application Data

[63] Continuation-in-part of Ser. No. 76,847, Sep. 19, 1979, abandoned.

[51] Int. Cl.³ .............................................. F16K 1/228
[52] U.S. Cl. ..................................... 251/174; 251/306
[58] Field of Search .............................. 251/174, 306

[56] References Cited

U.S. PATENT DOCUMENTS

| | | | |
|---|---|---|---|
| 2,054,064 | 9/1936 | Anderson | 251/306 |
| 2,882,010 | 4/1959 | Bryant | 251/306 |
| 3,025,035 | 3/1962 | Swain | 251/306 |
| 3,030,066 | 4/1962 | Swain | 251/306 |
| 3,059,897 | 10/1962 | Jensen | 251/306 |
| 3,080,145 | 3/1963 | Swain | 251/306 |
| 3,250,510 | 5/1966 | Williams | 251/306 |
| 3,578,287 | 5/1971 | Salerno et al. | 251/306 |
| 4,058,290 | 11/1977 | Nelimarkka | 251/306 |
| 4,162,782 | 7/1979 | Wilkins | 251/174 |

Primary Examiner—Martin P. Schwadron
Assistant Examiner—H. Jay Spiegel
Attorney, Agent, or Firm—Murray and Whisenhunt

[57] ABSTRACT

A valve seat contains a seat ring (12) with flat, parallel side faces (19, 20). The seat ring consists of steel or possibly of PTFE. When the valve is being shut by a throttle (1), a sealing surface of the throttle is pressed against the seat ring which adopt itself as to form and position to the mean line of the throttle, and the seat ring is displaced in a groove (18) in the plane of the seat. A couple of spring washers (10, 11) sealingly engage the parallel side faces of the seat ring. When the throttle is reopened the spring washers secure the seat ring in its position.

9 Claims, 4 Drawing Figures

VALVE SEAT

CROSS REFERENCE TO RELATED APPLICATION

This application is a continuation-in-part of my co-pending application Ser. No. 76,847, filed on Sept. 19, 1979, now abandoned.

TECHNICAL FIELD

The present invention relates to a valve seat in a valve housing. More particularly does the invention relate in the first place to a valve seat intended for butterfly valves.

BACKGROUND ART

The butterfly valves in existance today are usually built on the principle of soft gaskets. A very frequent valve type is illustrated in e.g. the Swedish patent specification 199078. With this valve type the whole of the valve housing is lined with a soft material, e.g. rubber or other polymer. A frequent thing is also to manufacture just the valve seat itself from a soft material. Examples of this valve type are illustrated in the Swedish patent specifications 175149 and 178131. There are also cases of the soft sealing element being instead placed on the sealing face of the throttle. Examples of this principle are shown in the Swedish patent specification 195072 and the German patent specifications 1011683 and 1232422. A disadvantage of soft sealing elements in butterfly valves is that their resistance to high-temperature media is often low. It is true that the insensitivness of synthetic rubber and certain other polymers to high temperatures has gradually improved, but still these kinds of material cannot in any way compare favourably with the resistance to high temperatures of steels and other metals and alloys. The same thing also applies to the resistance to certain chemically aggressive media. In these cases, too, the properties of high-alloyed stainless steels and other alloys are quite superior to those of soft materials of rubber type. These circumstances are, of course, well-known, and many a trial has been made with replacing the soft sealing elements by metallic ones. An example of this type of valve is disclosed in U.S. Pat. No. 4,058,290. A drawback of this valve, however is the wear between the throttle and the seat which has the form of a reselient ring, and also between the seat ring and the housing of the seat ring as the seat ring is displaced relative to the housing each time the throttle is opened or shut.

DISCLOSURE OF INVENTION

A first object of the present invention is to provide a valve seat having a good sealing capacity and not employing soft sealing elements made of rubber, plastics or similar materials. More specifically an object is to produce a valve seat having good sealing capacity and which can be entirely manufactured of metal. An object of the present invention is, however, that the principles of the invention shall not exclude the use of such soft materials as e.g. PTFE and nylon. There is rather an object that also such materials may be used for the manufacturing of the valve seat, if for some reason or other these are more suitable of otherwise more desirable than metallic materials. In other words, a purpose of the present invention is to create liberty of choice between different materials in regard to their convenience to the medium which the valve is intended to operate with. Further, there is an important object of the invention to provide a valve seat which can be used for throttles of different shapes, e.g. throttles having cylindrical, spherical or conical seal faces, or combinations of these or other shapes. An object of this invention is also to provide a butterfly valve being sturdy and reliable, simple to operate and having a long life because of i.a. a minimum of wear between the sealing members.

These and other objects can be attained by the valve seat containing a seat ring comprising flat, parallel side faces, that the seat ring is made of a a stiff material with a certain resilience in the radial direction of the ring such that the shape of the seat ring when subjected to a radial load may be displaced and/or deformed in the plane of the seat ring in a groove in the valve house, substantially without changing the circumference of the seat ring, and that means are provided to maintain the new shape and position of the seat ring when the seat ring is released from said radial load. Most favourably said means are provided sealingly to engage the parallel side surfaces of the seat ring when the seat ring is moving in said groove. According to a preferred embodiment said means consist of a pair of spring washers which from each side press against the side faces of the seat ring. The spring washers herein may define the shape of the groove in which the seat ring is displacably arranged. According to the embodiment the seat ring is further comparatively flat, which implies that its extension in the radial direction is at least twice the extension in the axial direction. Normally the seat ring consists of steel, preferably stainless or acid resistant steel, or other metal or alloy. The invention, however, does not exclude the possibility of making the seat ring completely or partially from stiff plastics in those cases when such materials can be acceptable in view of the medium in which the valve is intended to operate.

Further objects and advantages as well as characteristics of the invention will appear from the following description of the best mode of carrying out the invention.

BRIEF DESCRIPTION OF DRAWINGS

In the following description of the best mode of carrying out the invention reference will be made to the drawings.

FIGS. 3 and 4 illustrate one possible variation between the present application and the parent application, Ser. No. 76,847. The spring washer of the present application exerts greater force upon the seat ring in order to maintain the seat ring in its displaced position and/or shape, even upon valve opening by removal of the seal face from the seal ring. In contrast, the seal ring of the parent application, Ser. No. 76,847, would return to its original shape upon removal of the seal face from contact therewith. One way the increased force exerted by the spring washers (10 or 11) can be accomplished is illustrated in FIGS. 3 and 4, wherein FIG. 3 illustrates a spring washer 10a, and FIG. 4 illustrates a spring washer 10 which has a slightly modified shape as compared to the spring washer of FIG. 3, so that the washer has a stronger spring action when deformed as illustrated in FIG. 2 (other conditions remaining the same). Of course, thicker spring washers or the use of a material having a stronger spring action can also produce the same results.

Figure 3:
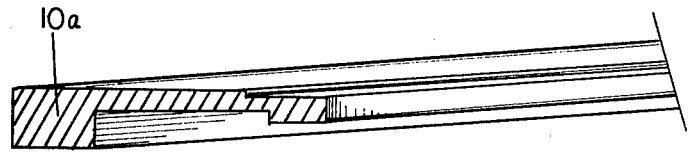
FIG. 3 illustrates a spring washer of the parent application, Ser. No. 76,847 before compression.
Figure 4:
FIG. 4 shows a spring washer of the present application before compression.

When the spring washer of FIG. 3 is compressed, however, that spring washer may adopt the same shape as the spring washer of FIG. 4 in its compressed condition.

BEST MODE OF CARRYING OUT THE INVENTION

Figure 1:
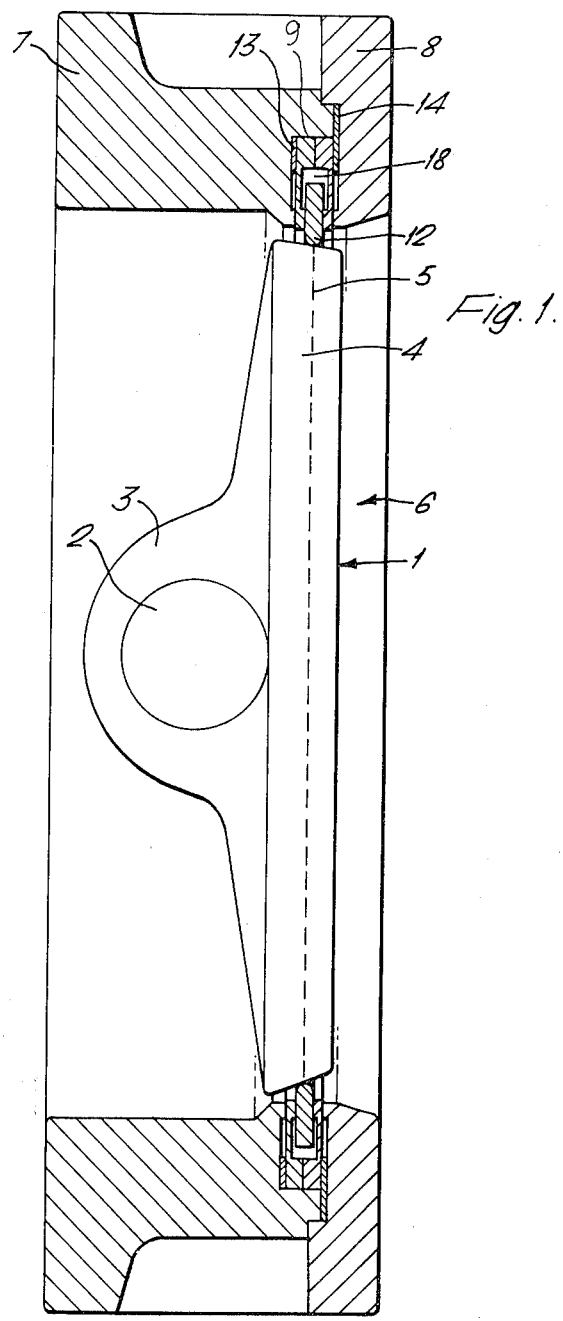
FIG. 1 is a section through a valve house provided with a valve seat according to the preferred embodiment of the invention. The figure also shows a throttle which is in sealing contact with the valve seat.

Reference is first being made to FIG. 1 that shows a throttle generally shown as 1. The throttle can be turned clockwise from the sealing position according to FIG. 1 to an open position and vice versa by means of a stem 2 carried in a bearing 3 on the throttle.

A seal face on the throttle 1 is shown as 4. The seal face 4 is annular and its mean line 5 has an elliptic shape with the major axis coinciding with a vertical plane to FIG. 1. As an alternative the mean line 5 has a circular shape. The throttle 1 is eccentrically mounted in bearings in a valve house, a.i. the centre axis of the stem 2 does not intersect the axis of symmetry through a valve opening in the valve house 6.

The valve house 6 consists of a main portion 7 and a covering plate 8 which is fixed to the main portion by means of screws which are not shown in the drawing. On the side which is turned to the covering plate 8 the main portion 7 of the valve house is provided with an annular recess 9. In the recess 9 there are provided two spring washers 10 and 11 which constitute carriers and bearing for a valve seat in the form of a seat ring 12. A pair of gaskets has been designated 13 and 14, respectively.

Figure 2:
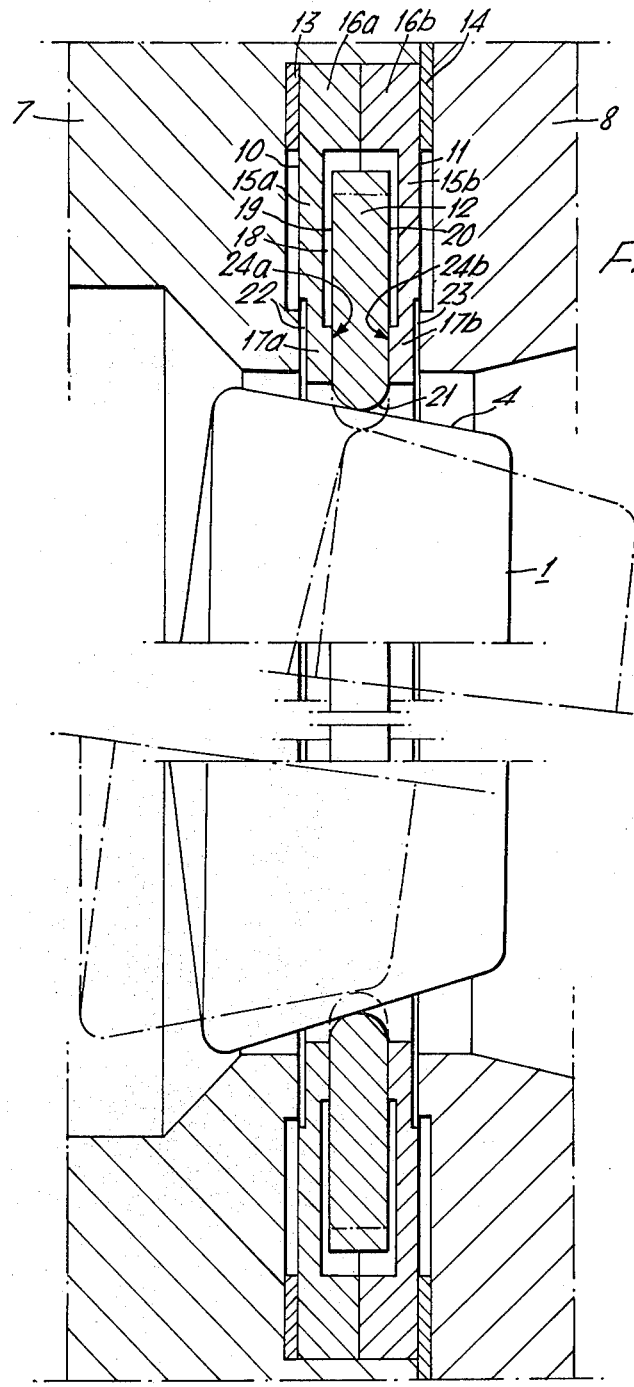
FIG. 2 shows the valve seat more in detail and how the valve seat can cooperate with the throttle shown in FIG. 1.

FIG. 2 shows more in detail how the valve seat ring 12 and the carriers and bearings 10 and 11 of the seat ring are designed. The latter members, as above mentioned, consist of a pair of spring washers, usually of stainless steel. The two washers 10 and 11 are reversedly designed. In a radial section they comprise a rib portion 15a and 15b, respectively, and a leg portion 16a and 17a as well as 16b and 17b respectively, in the outer and the inner end of the rib portion, respectively. The legs of each washer form right angles to the rib portion and are turned in the same direction. Further the inner legs 17a and 17b are shorter than the outer legs 16a and 16b, respectively. The annular groove between the washers 10 and 11 is shown as 18.

The valve seat, i.e. the ring 12, is comparatively flat and is provided with two parallel flat side surfaces 19 and 20 and has a rounded seat face 21. According to the embodiment the seat ring 12 consists of steel. Its extension in the radial direction is about four times as large as its thickness.

Further the spring washers 10 and 11 are worked such that they in the unloaded condition are slightly conic. More particularly the conicity implies that the legs 17a and 17b tend to approach each other. When mounting the assembly the seat ring 12 is arranged between the legs 17a and 17b whereupon the assembly consisting of the spring washers 10 and 11 and the intermediate seat ring 12 are brought together by means of the covering plate 8. Herein the legs 17a and 17b are forced out to a maximum which is determined on one hand by a space 22 between the main part of the valve house and the spring washer 10, and on the other hand a space between the covering plate 8 and the second spring washer 11. The forces developed by the spring washers 10, 11 are dimensioned such that they are not greater than the seat ring 12 may move in its plane in the groove 18 when subjected to a radial load from the throttle 1 when the throttle is being shut, while the flat, parallel end faces 24a and 24b of the legs 17a and 17b, respectively, sealingly engage the side faces 19 and 20 of the seat rings. However, at the same time the spring forces of the washers 10 and 11 are dimensioned such that they are sufficiently great to maintain the seat ring 12 in its possibly new position and with its possibly changed shaped when the ring is released from the radial load when the throttle is opened again. Therefore, through the spring action by the washers 10 and 11 there is obtained a tight joining without jamming the seat ring 12 harder than the seat ring being able to adapt its form and position after the shape and position of the throttle and thereafter maintaining its form and position when the valve is re-opened. Next time the throttle is shut the seat ring therefore normally will not be changed neither as far as its position or its form is concerned. This offers the advantage that the seat ring normally does not move when the valve is being shut or opened which means that wear can be avoided.

In the starting position the seat ring has a completely circular shape, which has been indicated by dashed lines in FIG. 2 illustrating the case when the mean line 5 of the throttle has an elliptical shape. When the valve is being shut the sealing face 4 on the throttle 1, however, will force the seat ring 12 to be more and more oval but with constant circumference. Finally when the throttle is completely shut the seat ring will concur with the elliptical shape of the mean ring 5. During these shape changes of the seat ring, the seat ring hence will be displaced in the groove 18 with maintained sealing action between the seat ring 12 and the flat end faces of the spring washers 17a and 17b, and 24a and 24b respectively. When the throttle is re-opened and the seat ring is released from the radial load from the throttle, the elliptical shape of the seat ring will be maintained by means of the spring washers 10, 11 which press against the side faces 19, 20 with forces which are sufficient to prevent ring 12 from re-adopting its circular resting position. In the case when the mean line 5 instead is circular, the shape of the seat ring will not change during the "primery" shutting action, but its position in the groove 18 can be changed, which position thereafter normally is maintained by means of the spring washers during subsequent shutting and opening actions.

The spring washers 10, 11 also have another function. They may namely absorb thermal expansions, variations of pressures and the like without impairing the sealing action. To the contrary the sealing action may be improved when a pressure of the fluid in the conduit is exerted upon each or both of the spring washers in the space 22 and /or 23, which pressure is transferred via the inner portions 17a and/or 17b of the spring washers.

I claim:

1. In a throttle valve comprising a valve housing having an annular recess therein, a throttle member pivotally movable in the valve housing and having an annular seal face throttle member seal face, the improvement comprising said valve seat including resilient means located in said annular recess and defining an annular groove, and a radially movable seat ring located in said annular groove, said seat ring being made of a stiff material but with sufficient radial direction resiliency such that when subject to a radial load from contact with the throttle member seal face said seat ring may be displaced and/or deformed in the radial direction, said resilient means and said seat ring cooperating so that when said ring moves in a radial direction under said radial load said resilient means sealingly engages said seat ring and when said radial load is removed from said seat ring said resilient means maintains said seat ring substantially in the displaced shape and position, so that wear between said seat ring and said seal face is minimized in that when said seat ring is circular and said seal face is circular, the seat ring is displaceable into alignment with said seal face and is maintained in the aligned position when said radial load is removed therefrom, and when said seat ring is circular and said seal face is elliptical, said seat ring is deformed into an elliptical shape and is maintained in said elliptical shape when said load is removed therefrom.

2. Valve of claim 1, wherein said resilient means comprises a pair of spring washers located on each side of said seat ring and sealingly pressing against said seat ring.

3. Valve of claim 2, wherein said spring washers define the shape of the annular groove in which said seat ring is displaceably carried.

4. Valve of any one of claims 1, 2 or 3, wherein said seat ring is comparatively flat with an extension in the radial direction which is at least twice that of the axial direction.

5. Valve of any one of claims 2 or 3, wherein the spring washers are pressed out by the seat ring during mounting of said seat ring, said seat ring has parallel side faces, and an inner portion of said spring washers resiliently sealingly presses against said parallel side faces of said seat ring.

6. Valve of claim 5, wherein said seat ring is made of steel or other metal or alloy.

7. Valve of claim 5, wherein said seat ring is at least partly made of stiff plastic material.

8. Valve of claim 1, wherein said seat ring is also deformed in the radial direction when subject to a radial load from contact with the throttle member seal face, and wherein said resilient means and said seat ring cooperate so than when said radial load is removed from said seat ring the resilient means maintain said seat ring substantially in the deformed shape and position.

9. A throttle valve comprising a valve housing having an annular recess therein, a throttle member pivotably movable in the valve housing, said throttle member having an annular seal face, a pair of spring means in said annular recess, said spring means defining an annular groove thereinbetween, a seat ring located in said annular groove between said spring means and made of a stiff material but with sufficient radial direction resiliency such that the shape of the seat ring when subjected to a radial load from contact with said throttle member seal face may be radially displaced in said groove between said spring means, said spring means and said seat ring cooperating so that said spring means sealingly engage said seat ring when said seat ring moves in said groove between said spring means, and when said radial load is removed from said seat ring said spring means maintains said seat ring substantially in the displaced position thereby minimizing wear between said seat ring and said throttle member seal face, in that when said seat ring is circular and said seal face is circular, the seat ring is displaceable into alignment with said seal face and is maintained in the aligned position when said radial load is removed therefrom, and when said seat ring is circular and said seal face is elliptical, said seat ring is deformed into an elliptical shape and is maintained in said elliptical shape when said radial load is removed therefrom.

* * * * *